US011993051B1

(12) United States Patent
Chen

(10) Patent No.: US 11,993,051 B1

(45) Date of Patent: May 28, 2024

(54) BOARD CREASING AND CUTTING APPARATUS AND METHOD FOR PRODUCING PACKAGING BOX

(71) Applicant: SAGA Computer Numerical Control Co., Ltd, Hefei (CN)

(72) Inventor: Hong Chen, Hefei (CN)

(73) Assignee: SAGA Computer Numerical Control Co., Ltd, Hefei (CN)

( * ) Notice: Subject to any disclaimer, the term of this patent is extended or adjusted under 35 U.S.C. 154(b) by 0 days.

(21) Appl. No.: 18/362,766

(22) Filed: Jul. 31, 2023

Related U.S. Application Data

(63) Continuation of application No. PCT/CN2023/101409, filed on Jun. 20, 2023.

(30) Foreign Application Priority Data

Jan. 16, 2023 (CN) ......................... 202310057488.0

(51) Int. Cl.
*B31B 50/00* (2017.01)
*B31B 50/07* (2017.01)
*B31B 50/20* (2017.01)
*B31B 50/26* (2017.01)

(52) U.S. Cl.
CPC ............ *B31B 50/006* (2017.08); *B31B 50/07* (2017.08); *B31B 50/20* (2017.08); *B31B 50/26* (2017.08)

(58) Field of Classification Search
CPC ....... B31B 50/006; B31B 50/07; B31B 50/20; B31B 50/26; B31B 50/02; B31B 50/066; B31B 50/14; B31B 50/25; B31B 50/59; B31B 70/001; B31B 70/88; B31F 1/07; B31F 1/08; B31F 2201/07
USPC ............................................ 493/51; 382/141
See application file for complete search history.

(56) References Cited

U.S. PATENT DOCUMENTS

| | | | | |
|---|---|---|---|---|
| 11,214,032 | B2 * | 1/2022 | Pettersson | B31B 50/104 |
| 11,242,214 | B2 * | 2/2022 | Osterhout | B26D 7/27 |
| 11,465,382 | B2 * | 10/2022 | Gonzalez Olmos | B31B 50/262 |
| 11,535,000 | B2 * | 12/2022 | Giovanneschi | B31B 50/724 |
| 11,541,622 | B2 * | 1/2023 | Valterio | B31F 1/10 |
| 11,697,516 | B2 * | 7/2023 | Chang | B65B 59/02 53/449 |
| 11,703,700 | B2 * | 7/2023 | Jung | G02F 1/1303 250/559.39 |

(Continued)

*Primary Examiner* — Sameh Tawfik
(74) *Attorney, Agent, or Firm* — Westbridge IP LLC

(57) ABSTRACT

Disclosed are a board creasing and cutting apparatus and a method for producing a packaging box, the apparatus comprising: a packaging box board, a housing, a feeding mechanism, a scanning assembly and an identification mechanism, wherein the identification mechanism is used for identifying sided-lines and an identification point location of the conveyed packaging box board; a material-conveying mechanism, a moving mechanism and a back point-scanning assembly, wherein the back point-scanning assembly is provided at a bottom end of the moving mechanism driving the back point-scanning assembly to move to identify the sided-lines of the packaging box board; a controller determining a creasing and cutting path of the packaging box board via the scanning assembly, the identification mechanism and the back point-scanning assembly; and a primary working platform and an actuating mechanism.

8 Claims, 9 Drawing Sheets

(56) References Cited

U.S. PATENT DOCUMENTS

| | | | | |
|---|---|---|---|---|
| 11,712,758 | B2 * | 8/2023 | Maslar | B23K 26/22<br>382/141 |
| 2006/0272283 | A1 * | 12/2006 | Kawanishi | B65B 11/54<br>53/76 |
| 2015/0231739 | A1 * | 8/2015 | Zimmer | B23K 26/60<br>219/121.68 |
| 2017/0129632 | A1 * | 5/2017 | Williams | B65B 51/26 |
| 2018/0346166 | A1 * | 12/2018 | Chang | B65B 59/003 |
| 2019/0134934 | A1 * | 5/2019 | Or | B31B 50/003 |
| 2021/0138755 | A1 * | 5/2021 | Langen | B31B 50/07 |

* cited by examiner

BOARD CREASING AND CUTTING APPARATUS AND METHOD FOR PRODUCING PACKAGING BOX

CROSS-REFERENCE TO RELATED APPLICATIONS

This application is a continuation of International Application No. PCT/CN2023/101409, filed on Jun. 20, 2023, which claims priority to Chinese Patent Application No. 202310057488.0, filed on Jan. 16, 2023. All of the aforementioned applications are incorporated herein by reference in their entireties.

TECHNICAL FIELD

The present application relates to the technical field of packaging box processing, in particular to a board creasing and cutting apparatus for producing a packaging box and a method thereof.

BACKGROUND

A packaging box is generally used for packaging articles of various sizes is generally made of paper, plastic, etc.; a pattern of the packaging box is usually printed on a surface of a board, a folded part of the packaging box is pressed according to creasing to form a crease, then the excess part of the packaging box board is cut and assembled to get the packaging box.

The creasing process is that a walking-type creasing and cutting multi-functional trolley performs creasing on a back of a to-be-processed packaging box board (i.e., a side on which the packaging box pattern is not printed); the cutting process is that the walking-type creasing and cutting multi-functional trolley performs cutting on a front side of the to-be-processed packaging box board (i.e., a side on which the packaging box pattern is printed); the creasing and the cutting processes are respectively performed on the same packaging box board, during which the packaging box board to be processed needs to be inverted once by means of an additional turnover mechanism; since after turnover, it cannot be ensured that the packaging box board to be processed is still in the original position, scanning is required both before and after the turnover to locate the pattern of the packaging box board to be processed to facilitate accurate creasing or cutting out the required packaging box board; and this method is not only time-consuming and affects working efficiency, but also needs to be implemented by adding an additional structure, which increases the complexity of equipment.

SUMMARY

In view of the shortcomings of the prior art, it is an object of the present application to provide a board creasing and cutting apparatus and method for producing a packaging box, which can solve the problems of being not only time-consuming and affecting working efficiency, but also needing to implement the method by adding an additional structure, which increases the complexity of equipment.

In order to achieve the above object, the present application is a technical solution as follows.

The present application is implemented by the following technical solution: a board creasing and cutting apparatus for producing a packaging box, including:

a packaging box board having a surface provided with a two-dimensional code corresponding thereto and an identification point capable of characterizing a location of a pattern thereof;

a housing having one end provided with a material-loading mechanism used for conveying a to-be-processed packaging box board to a predetermined height;

a feeding mechanism provided at a top end of the housing and used for adsorbing and moving the packaging box board reaching the predetermined height;

a scanning assembly provided on a surface of the housing and used for scanning a two-dimensional code on the surface of the packaging box board to acquire packaging box board pattern information;

an identification mechanism provided on a surface of the housing and used for identifying sided-lines and an identification point location of the conveyed packaging box board;

a material-conveying mechanism used for conveying the identified packaging box board;

a moving mechanism slidably connected to the top end of the housing;

a back point-scanning assembly provided at a bottom end of the moving mechanism driving the back point-scanning assembly to move to identify the sided-lines of the packaging box board;

a controller electrically connected to the scanning assembly, the identification mechanism, and the back point-scanning assembly, wherein the controller determines a creasing and cutting path of the packaging box board through the scanning assembly, the identification mechanism, and the back point-scanning assembly;

a primary working platform provided inside the material-conveying mechanism and connected to an air pump via a converter, wherein a surface of the primary working platform is provided with a through-hole providing two air flows for conveying the packaging box board; and an actuating mechanism provided at the bottom end of the moving mechanism, wherein the moving mechanism is used for driving the actuating mechanism to move to crease and cut the packaging box board defining the creasing and cutting path.

Further, the material-loading mechanism comprises a lifting assembly, a bearing plate, a lifting plate, a tuyere and a detection assembly; the lifting assembly is mounted inside the housing, and a top end of the lifting assembly is provided with a lifting plate; the lifting assembly is used for driving the lifting plate to lift, and a side of the housing is provided with a bearing plate; the top end of the bearing plate is provided with a board separating and stirring piece; a tuyere connected to the air pump and a detection assembly for detecting the lifting height of the packaging box board are provided on a side of the bearing plate.

Further, the material-loading mechanism further comprises a centering assembly and a baffle; a surface of the lifting plate is provided with a baffle, the lifting plate is of a metal structure, and the bottom end of the baffle is provided with a magnet; the centering assembly comprises a blocking assembly, pulleys and a first synchronous belt, and a surface of the lifting plate is provided with a first sliding groove; the pulleys are rotatably connected to the bottom end of the lifting plate, and the pulleys are connected to each other via a first synchronous belt; two blocking assemblies are respectively connected to two sides of the first synchronous belt, and the first synchronous belt is capable of rotating to drive the two blocking assemblies to move close to or away from each other; the blocking assembly comprises a vertical plate, a connecting plate and a first mounting plate, and two sides of a bottom end of the vertical plate are inserted into and slide along the first sliding groove; the two sides of the bottom end of the vertical plate are connected via a connecting plate, and the bottom end of the connecting plate is connected to the first synchronous belt via a first mounting plate.

Further, the feeding mechanism comprises a material-moving assembly and a material fetching assembly, and the material-moving assembly is used for driving the material fetching assembly to move linearly; the material fetching assembly comprises an overhang plate, a telescopic cylinder, a transverse plate and vacuum chucks; the overhang plate is connected to the material-moving assembly, and the overhang plate is connected to the telescopic cylinder; the telescopic cylinder is connected to the transverse plate, and a plurality of vacuum chucks are fixed on a surface of the transverse plate; the vacuum chucks are connected to the air pump.

Further, the identification mechanism comprises rotating telescopic cylinders, a pressing plate, front point-scanning assemblies, a connecting block, a fourth motor, a second synchronous belt, second mounting plates, a scanning platform and a fourth driven wheel, a scanning platform is fixed inside the housing, and the scanning platform is of a transparent structure; a connecting block is provided at a side of the scanning platform, and a second sliding groove is provided on a surface of the connecting block; two front point-scanning assemblies are slidably connected inside the scanning platform, and a side of each of the front point-scanning assemblies is connected to a rotating telescopic cylinder; a pressing plate is fixed at a top end of each of the rotating telescopic cylinders, a second mounting plate is fixed at bottom ends of the two rotating telescopic cylinders, and the two second mounting plates are both mounted on a side of the second synchronous belt; the second synchronous belt is respectively connected to a fourth driven wheel and a fourth driving wheel, and the fourth driving wheel is connected to a fourth motor.

Further, one of the corners of the pressing plate is tilted, and a light-shading plate is provided on a surface of the pressing plate; the front point-scanning assembly and the back point-scanning assembly are of the same structure, and the front point-scanning assembly comprises a camera and a light-supplementing lamp.

Further, the actuating mechanism comprises a creasing head, an axial motor and a cutting head, a bottom end of the axial motor being provided with the creasing head and the cutting head.

Further, the actuating mechanism further comprises a discharging tray obliquely connected to one side of the housing, and one end of the discharging tray is an opening; the width of the opening is greater than that of the discharging tray, and a material receiving plate is connected to a side of the discharging tray; a base is fixed at the bottom end of the discharging tray.

A board creasing and cutting method for producing a packaging box, which comprises the following steps of:

Step S1: determining, for each type of packaging box, a two-dimensional code corresponding thereto and an identification point capable of characterizing the position of the pattern thereof, and printing the two-dimensional code and the identification point together with the packaging box pattern on a surface of the packaging box board; and determining a creasing and cutting path for inputting the type of packaging box board;

Step S2: stacking a to-be-processed packaging box board on a material-loading mechanism with the back of the board facing upwards, and picking and moving a piece of the to-be-processed packaging box board by means of vacuum adsorption using the material-loading mechanism in combination with a feeding mechanism;

Step S3: scanning a two-dimensional code of the to-be-processed packaging box board by a scanning assembly, identifying the type of the packaging box board, and determining the creasing and cutting path of the type of the packaging box board;

Step S4: moving the processed packaging box board to the identification mechanism via the feeding mechanism, and identifying and determining the four-sided boarder lines and identification point information at two ends of the front side of the packaging box board from the front side using the identification mechanism;

Step S5: placing the identified packaging box board on a material-conveying mechanism using the feeding mechanism, and enabling the material-conveying mechanism to move and convey the packaging box board to a creasing and cutting position via a primary working platform in cooperation with positive pressure blowing;

Step S6: identifying sided-line information about four sides of the packaging box board by scanning for the second time from the back of the packaging box board using a back point-scanning assembly;

Step S7: determining packaging box board pattern information by using the sided-line information scanned for the second time on the back and the four-sided boarder lines and identification point information at two ends of the front side scanned on the front side;

Step S8: mirroring the packaging box board pattern information to the back of the packaging box board via a controller, and invoking the creasing and cutting path of the type of packaging box board; and Step S9: fixing the packaging box board via the primary working platform in cooperation with the negative pressure suction and performing a creasing-cutting action on the back of the packaging box board using an actuating mechanism according to the creasing and cutting path, and outputting the processed semi-finished product.

Further, the identifying and determining the four-sided boarder lines and identification point information at two ends of the front side of the packaging box board from the front side using the identification mechanism comprises: identifying the sided-lines of one end of the packaging box board and the identification point information using a camera and a light-supplementing lamp; moving the packaging box board via the feeding mechanism, and identifying the sided-lines of the other end of the packaging box board and the identification point location information using the camera and the light-supplementing lamp again.

Compared with the prior art, the present application has the beneficial effects as follows.

The centering assembly provided in the material-loading mechanism of the present application is capable of centering and placing a plurality of stacked packaging box boards without subsequent adjustment by an operator, and the design of the board separating and stirring piece and the tuyere can eliminate the adhesion between the boards and ensure that only one packaging box board is absorbed and picked at a time for processing; and it is convenient for use.

According to the present application, an identification point is provided on a surface of the packaging box board, and a pattern of the packaging box board can be mirrored on the back of the packaging box board by recognition twice to facilitate the subsequent direct creasing and cutting, without using a turnover device, so that the structure of the whole creasing and cutting apparatus is simpler and the processing efficiency is higher.

The present application is fully automated without human intervention and with low labor costs.

BRIEF DESCRIPTION OF THE DRAWINGS

The disclosure of the present application is described with reference to the accompanying drawings. It should be understood that the drawings are for purposes of illustration only and are not intended to limit the scope of the application, in which like reference numerals are used to refer to like parts. wherein.

DETAILED DESCRIPTION OF THE EMBODIMENTS

It will be readily understood that various alternative constructions and implementations may be devised by a person skilled in the art without departing from the spirit of the application. Therefore, the following detailed description and the accompanying drawings are merely illustrative of the embodiments of the present application and are not to be taken as a whole or as a definition or limitation of the application.

For a board creasing and cutting apparatus for producing a packaging box, since there is a placement deviation of a to-be-processed packaging box board in the printing process, resulting in a slight dislocation between the printed content and a board sided-line, a plurality of identification points are printed on the same board at four corners of the printed content of a packaging box pattern; when the creasing and cutting process is performed, these identification points are finally used as a positioning reference, and the packaging box pattern information can be positioned via the identification points to identify a creasing and cutting path for processing; in addition, all the information, such as identification points, patterns and creases, etc. of the to-be-processed packaging box board are written in a computer program and stored in a controller; each to-be-processed packaging box board has a file with a unique name corresponding thereto, is converted into a two-dimensional code and is printed at a corresponding position of the to-be-processed packaging box board, is easy to be identified by a scanning assembly 28, and is easy to call for an application program for executing corresponding creasing and cutting; therefore, the whole creasing and cutting process is automatically completed through these programmed driving programs.

Figure 13:
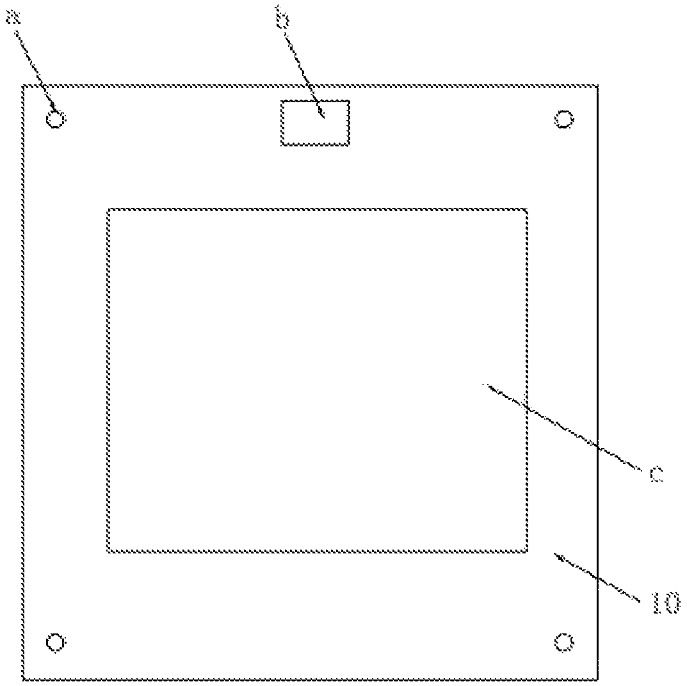
FIG. 13 is a schematic diagram showing a structure of a packaging box board according to an embodiment of the present application.
Figure 14:
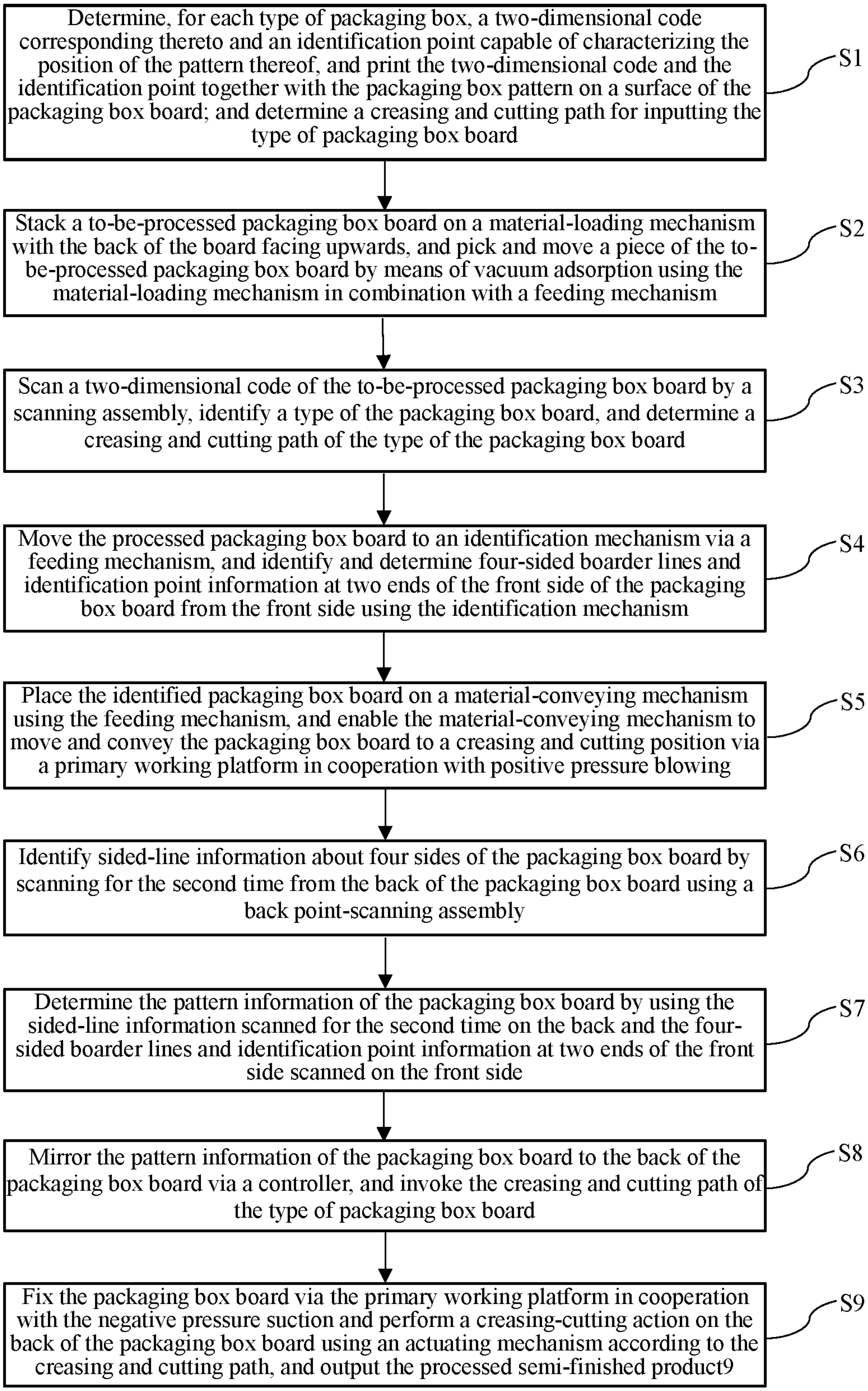
FIG. 14 is a flow chart of a board creasing and cutting method for producing a packing box according to the present application.

By way of example, a packaging box board 10 is as shown in FIG. 13, a surface of the packaging box board 10 is provided with a two-dimensional code corresponding thereto and an identification point capable of characterizing the position of a pattern thereof; by way of example, an area c on the surface of the packaging box board 10 is printed packaging pattern information and an area a is an identification point which can be any shape; the identification point according to the present application is in the shape of a dot and four of which are distributed at four corners; the identification points therein are printed on the surface of the board together with the packaging box pattern information, and the distance therebetween is constant, i.e., the packaging box pattern information can be obtained by the position of the identification points; an area b is a two-dimensional code; all the identification points, patterns and creases, cutting routes, etc. of the to-be-processed packaging box board 10 are recorded via this two-dimensional code.

Figure 1:
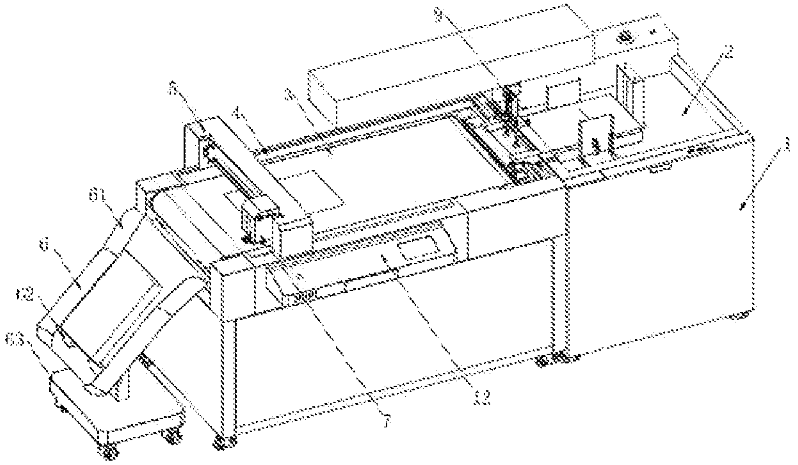
FIG. 1 is a schematic diagram showing an overall structure of a board creasing and cutting apparatus for producing a packing box according to the present application.
Figure 4:
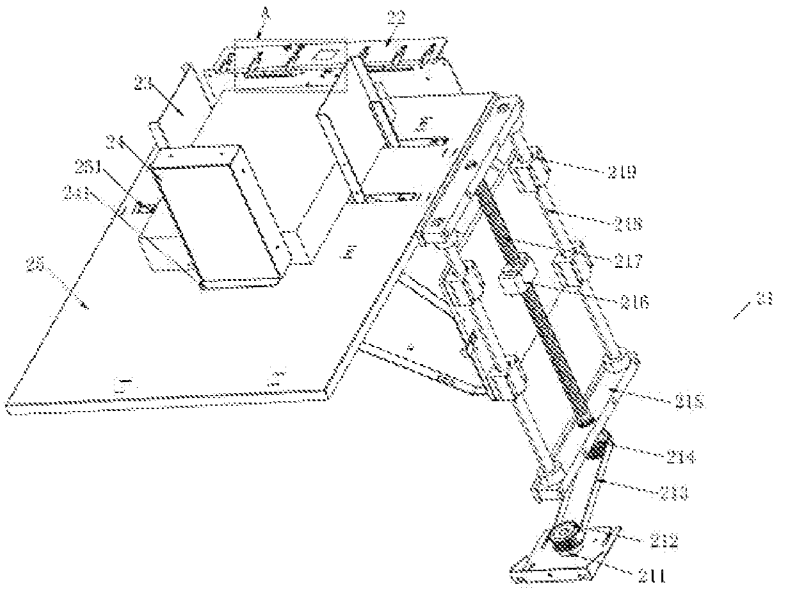
FIG. 4 is a schematic diagram showing a material-loading mechanism according to an embodiment of the present application.
Figure 5:
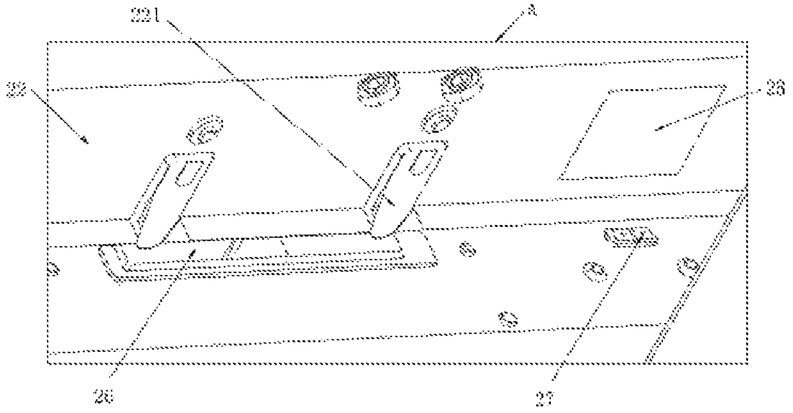
FIG. 5 is an enlarged diagram at A of FIG. 4 according to an embodiment of the present application.
Figure 6:
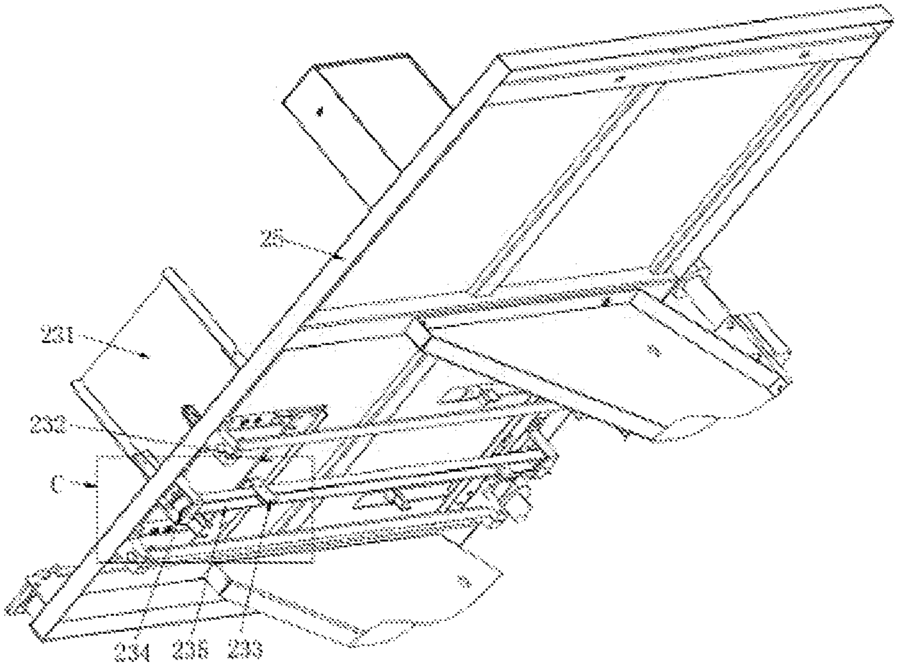
FIG. 6 is a schematic diagram showing a centering assembly according to an embodiment of the present application.

The creasing and cutting apparatus cuts and creases the printed pattern so that the cut and creased packaging box board can be manually spliced to form a packaging box, which, as shown in FIG. 1, the apparatus comprises a housing 1 having one end provided with a material-loading mechanism 2 used for conveying a to-be-processed packaging box board 10 to a predetermined height; as shown in FIGS. 4-6, the material-loading mechanism 2 comprises a lifting assembly 21, a bearing plate 22, a lifting plate 25, a tuyere 26 and a detection assembly 27.

A lifting assembly 21 is mounted inside the housing 1, and a top end of the lifting assembly 21 is provided with a lifting plate 25; the lifting assembly 21 is used for driving the lifting plate 25 to lift in the housing 1 and can be one of electric lifting, pneumatic lifting or hydraulic lifting, and any structure capable of lifting is within the scope of protection of the present application; by way of example, the lifting assembly 21 comprises a first motor 211, a first driving wheel 212, a first belt 213, a first driven wheel 214, a mounting base 215, a lead screw nut 216, a lead screw 217, a limiting rod 218 and a limiting block 219, wherein the first motor 211 is connected to the first driving wheel 212, and the first driving wheel 212 is connected to the first driven wheel 214 via the first belt 213; the first driven wheel 214 is connected to a lead screw 217; the lead screw 217 is connected to the lead screw nut 216 connected to the lifting plate 25; two ends of the lead screw 217 are rotatably connected to the mounting base 215; the limiting rod 218 is fixed between the mounting bases 215, the limiting rod 218 is slidably connected to the limiting block 219, and the lifting plate 25 is fixed on a side of the limiting block 219; when lifting is performed, the first driving wheel 212 is driven to rotate by the first motor 211, and then the first driven wheel 214 is driven to rotate by the first belt 213, so that the lead screw 217 rotates, and the lead screw 217 rotates, i.e., the lifting plate 25 is driven to lift by the movement of the lead screw nut 216.

In addition, a side of the housing 1 is provided with a bearing plate 22; the cross section of the bearing plate 22 is of a T-shaped structure, and the top end of the bearing plate 22 is provided with a board separating and stirring piece 221; the board separating and stirring piece 221 is used for stripping the packaging box board, ensuring that the feeding mechanism 9 can only pick one packaging box board at a time.

A side of the bearing plate 22 is provided with a tuyere 26 and a detection assembly 27, wherein the tuyere 26 is connected to an air pump, and when the feeding mechanism 9 sucks and picks the packaging box board, the tuyere 26 blows to further ensure that the packaging box board can be separated, so that the feeding mechanism 9 only sucks and picks one packaging box board at a time; the detection assembly 27 is used for detecting the lifting height of the packaging box board material 10, and for example, the detection assembly 27 is used for detecting the lifting height of the packaging box board material 10 on the lifting plate 25, and stopping the lifting assembly 21 after lifting to a specific height; the detection assembly 27 therein may be an infrared detection means, but is not limited thereto.

The material-loading mechanism 2 further comprises a centering assembly 23 and a baffle 24; a surface of the lifting plate 25 is provided with a baffle 24, the lifting plate 25 is of a metal structure, and the bottom end of the baffle 24 is provided with a magnet 241; the centering assembly 23 comprises a blocking assembly, pulleys 234 and a first synchronous belt 235, and a surface of the lifting plate 25 is provided with a first sliding groove 251; the pulleys 234 are rotatably connected to the bottom end of the lifting plate 25, and the pulleys 234 are connected to each other via a first synchronous belt 235; two blocking assemblies are respectively connected to two sides of the first synchronous belt 235, and the first synchronous belt 235 is capable of rotating to drive the two blocking assemblies to move close to or away from each other; the blocking assembly comprises a vertical plate 231, a connecting plate 232 and a first mounting plate 233, wherein two sides of the bottom end of the vertical plate 231 are inserted into and slide along the first sliding groove 251; the two sides of the bottom end of the vertical plate 231 are connected via a connecting plate 232, and the bottom end of the connecting plate 232 is connected to the first synchronous belt 235 via a first mounting plate 233; when processing the packaging box boards, a plurality of stacked boards are placed on the surface of the lifting plate 25, and then the packaging box boards are centered on the surface of the lifting plate 25 using the centering assembly 23 and the baffle 24; the stacked boards are placed between two vertical plates 231, and then the vertical plates 231 are pushed towards the surface of the packaging box board 10, the vertical plates 231 drive the first synchronous belt 235 to rotate, and then drive the other vertical plate 231 to move at the same time when being pushed, so that the two vertical plates 231 close to clamping the packaging box boards 10, and the other side pushing the baffle 24 in contact with the packaging box boards 10, when same is pushed to this position, the baffle 24 is attracted and fixed to the lifting plate 25 via the magnet 241; the stacked packaging box boards 10 are placed at the center of the lifting plate 25.

Figure 7:
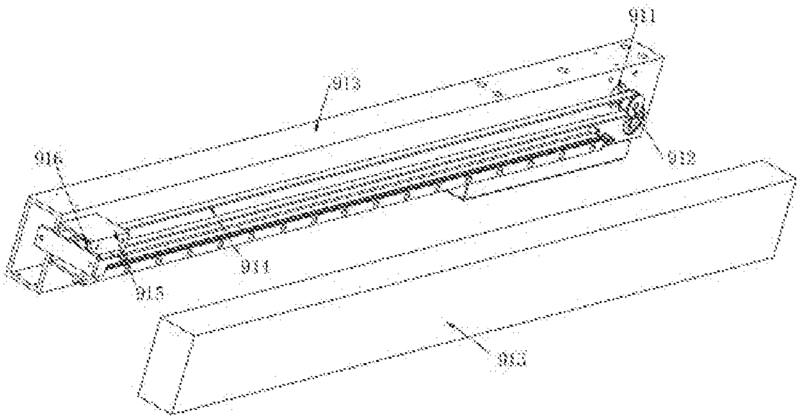
FIG. 7 is a schematic diagram showing a structure of a material-moving assembly according to an embodiment of the present application.
Figure 8:
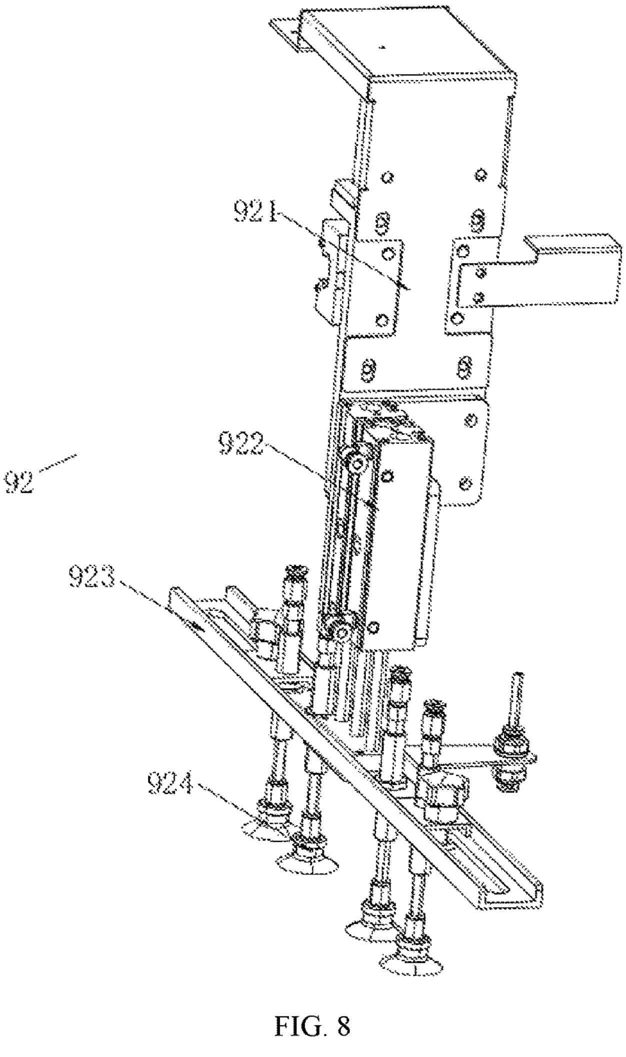
FIG. 8 is a schematic diagram showing a material extracting assembly according to an embodiment of the present application.

A feeding mechanism 9 is provided at a top end of the housing 1 and used for adsorbing and moving the packaging box board 10 reaching the predetermined height; as shown in FIGS. 7 and 8, the feeding mechanism 9 comprises a material-moving assembly 91 and a material fetching assembly 92, wherein the material-moving assembly 91 is used for driving the material fetching assembly 92 to move linearly; the material-moving assembly 91 is a linear movement assembly, and any structure capable of realizing linear movement is within the scope of the present application. By way of example, the material-moving assembly 91 comprises a second motor 911, a second driving wheel 912, a robotic arm 913, a second belt 914, a fixing plate 915, and a second driven wheel 916, wherein two ends of the surface of the robotic arm 913 are respectively rotatably connected to the second driving wheel 912 and the second driven wheel 916, and the second driving wheel 912 is connected to the second motor 911, the second driving wheel 912 and the second driven wheel 916 are connected via a second belt 914, and a fixing plate 915 is fixed on a side of the second belt 914.

The material fetching assembly 92 comprises an overhang plate 921, a telescopic cylinder 922, a transverse plate 923 and vacuum chucks 924; the overhang plate 921 is connected to the material-moving assembly 91, specifically, the overhang plate 921 is connected to the fixing plate 915 and a telescopic cylinder 922 is connected to a transverse plate 923, and a plurality of vacuum chucks 924 are fixed on the surface of the transverse plate 923; a plurality of the vacuum chucks 924 are fixed to the transverse plate 923 via bolts, so that the spacing between each of the vacuum chucks 924 is adjustable to adapt to absorbing and conveying packaging box boards of different sizes; the vacuum chucks 924 are connected to the air pump.

A scanning assembly 28 is provided on a surface of the housing 1 and used for scanning a two-dimensional code on the surface of the packaging box board 10 to acquire pattern information of the packaging box board 10; the scanning assembly 28 is a two-dimensional code scanner.

Figure 11:
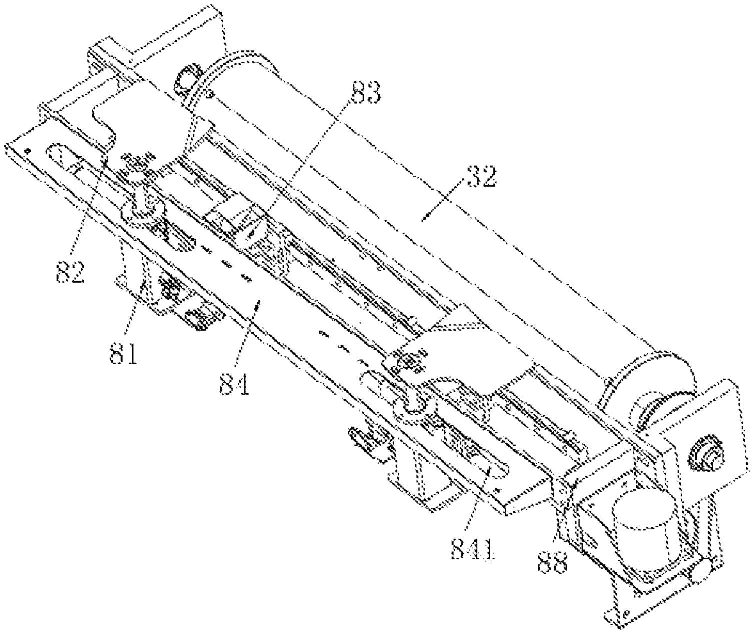
FIG. 11 is a schematic diagram showing a structure of a recognition mechanism according to an embodiment of the present application.
Figure 12:
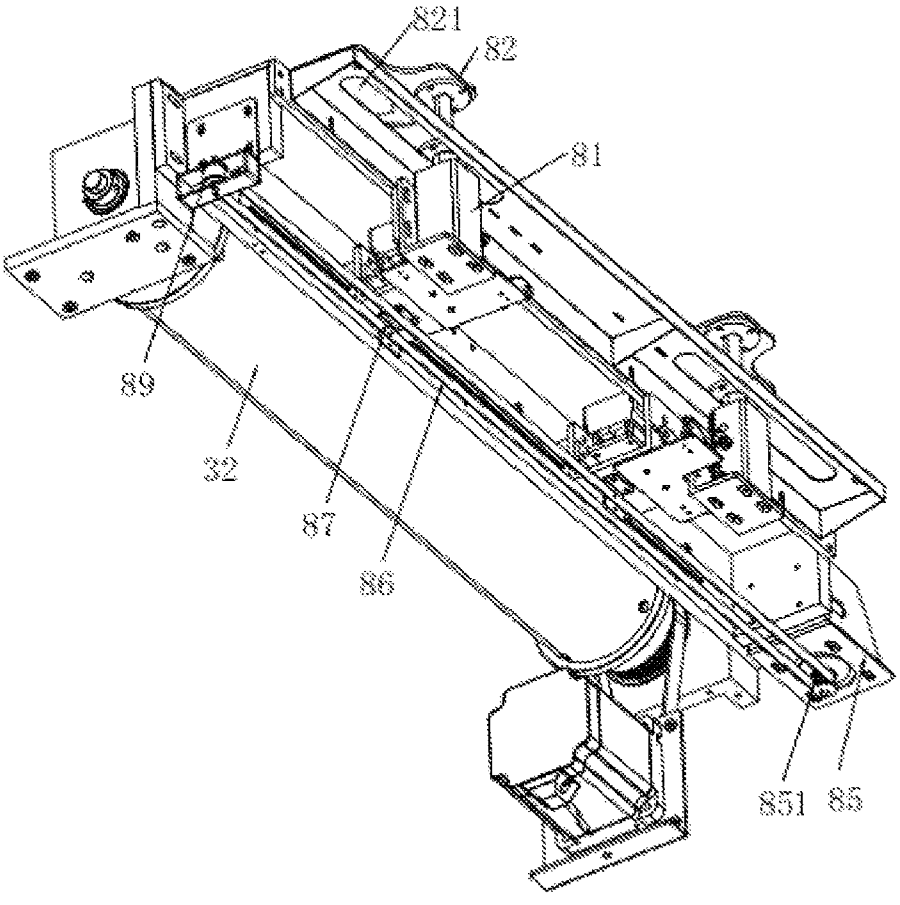
FIG. 12 is a schematic diagram showing a bottom structure of a recognition mechanism according to an embodiment of the present application.

An identification mechanism 8 is provided on a surface of the housing 1 and used for identifying sided-lines and an identification point location of the conveyed packaging box board 10; specifically, as shown in FIGS. 11 and 12, the identification mechanism 8 comprises a rotating telescopic cylinder 81, a pressing plate 82, front point-scanning assemblies 83, a connecting block 84, a fourth motor 85, a second synchronous belt 86, second mounting plates 87, a scanning platform 88 and a fourth driven wheel 89, wherein the scanning platform 88 is fixed inside the housing 1 and is of a transparent structure. By way of example, the scanning platform 88 is of toughened glass for providing light required for scanning; the side of the scanning platform 88 is provided with a connecting block 84 having a surface provided with a second sliding groove 841.

Two front point-scanning assemblies 83 are slidably connected inside the scanning platform 88, and a side of each of the front point-scanning assemblies 83 is connected to a rotating telescopic cylinder 81; the rotating telescopic cylinder 81 therein is a rotating cylinder and is a prior art. The rotating telescopic cylinder 81 rotates when lifting, a pressing plate 82 is fixed at a top end of each of the rotating telescopic cylinders 81, and the position of the pressing plate 82 can be changed when the rotating telescopic cylinder 81 rotates when lifting.

The bottom ends of the two rotating telescopic cylinders 81 are both fixed with a second mounting plate 87, and the two second mounting plates 87 are both mounted on the side of the second synchronous belt 86; the second synchronous belt 86 is respectively connected to a fourth driven wheel 89 and a fourth driving wheel 851 connected to a fourth motor 85; the fourth driving wheel 851 can be driven to rotate by the fourth motor 85; when the fourth driving wheel 851 rotates, the second synchronous belt 86 and the fourth driven wheel 89 can be driven to rotate; and when the second synchronous belt 86 rotates, the two front point-scanning assemblies 83 and the rotating telescopic cylinder 81 can be combined to be driven to move away from or close to each other to realize the identification of packaging box boards with different sizes.

Figure 16:
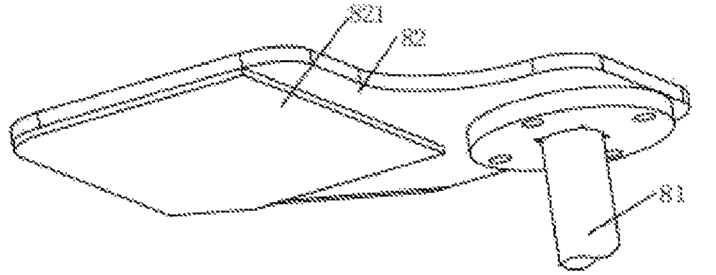
FIG. 16 is a schematic diagram showing a connecting structure of a pressing plate and a light-shading plate according to the present application.
Figure 17:
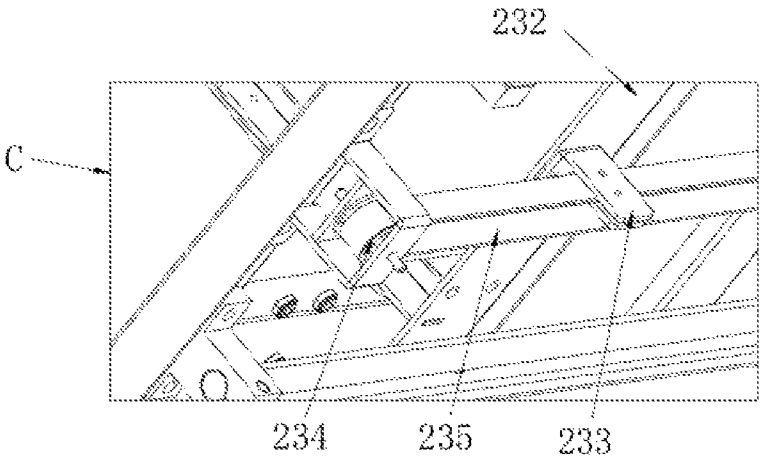
FIG. 17 is an enlarged diagram at C of FIG. 6 according to the present application.

In order to prevent the packing box board 10 from being folded or wrinkled due to the blocking of the pressing plate 82 when the pressing plate 82 is pressed down, one of the corners of the pressing plate 82 is tilted to facilitate the pressing plate 82 reaching the top end of the packing box board 10 to press same; and a surface of the pressing plate 82 is provided with a light-shading plate 821; as shown in FIG. 16, the light-shading plate 821 therein is used for shading light, by way of example, the light-shading plate 821 uses a black self-adhesive sponge sheet; it is ensured that there is no light reflection inside the internal front point-scanning assembly 83 to reduce interference from reflected light.

The front point-scanning assembly 83 and the back point-scanning assembly 11 are of the same structure, and the front point-scanning assembly 83 comprises a camera and a light-supplementing lamp; the front point-scanning assembly 83 acquires the information about the sided-line and the identification point of the packaging box board 10 from the bottom, i.e., from the front of the packaging box board 10 via a camera; the back point-scanning assembly 11 acquires the information about the sided-line of the packaging box board 10 from the top of the packaging box board 10, i.e., from the back of the packaging box board 10 via a camera; the obtained sided-line information can be used by the controller 12 to calculate the location information about the identification point at the time of the second point-scanning using the point-scanning information about the front point-scanning assembly 83; and since the identification point has a certain location with the packaging box board pattern, the packaging box board pattern information at the time of the second point-scanning can be obtained to facilitate creasing and cutting.

Figure 2:
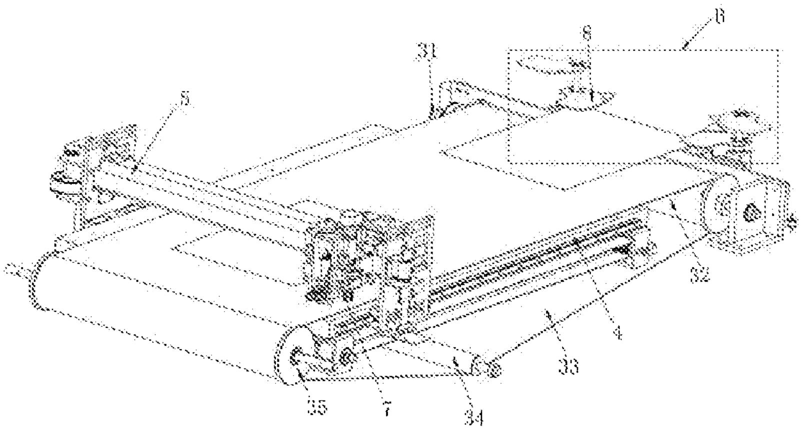
FIG. 2 is a schematic diagram showing a connecting structure between the material-conveying mechanism and the primary working platform according to an embodiment of the present application.

A material-conveying mechanism 3 is used for conveying the identified packaging box board 10; as shown in FIG. 2, the material-conveying mechanism 3 comprises a fifth motor 31, a driving roller shaft 32, a conveyor 33, a pressing roller 34 and a driven roller shaft 35, wherein the fifth motor 31 is mounted in the housing 1 and connected to the driving roller shaft 32, and the driving roller shaft 32 therein is connected to the driven roller shaft 35 via the conveyor 33, a pressing roller 34 is provided at the bottom of the inner side of the conveyor 33, and the pressing roller 34 presses down the conveyor 33 to have the function of adjusting the tension of the conveyor 33; when the material-conveying mechanism 3 is started, the fifth motor 31 drives the driving roller shaft 32 to rotate, and then the conveyor 33 drives the pressing roller 34 and the driven roller shaft 35 to rotate synchronously.

Figure 9:
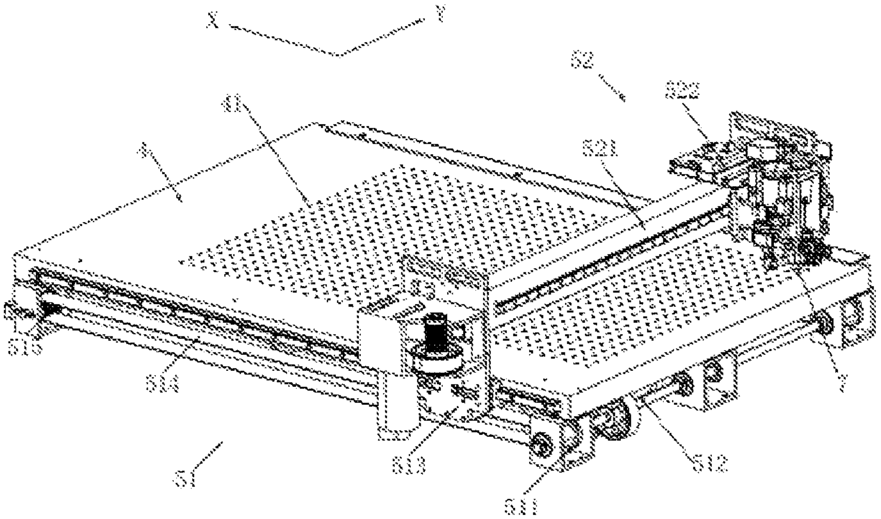
FIG. 9 is a schematic diagram showing a structure of a material-moving mechanism according to an embodiment of the present application.

A moving mechanism 5 is slidably connected to the top end of the housing 1; as shown in FIG. 9, the moving mechanism 5 is used for driving the actuating mechanism 7 to move in the Y-axis and X-axis directions, and any mechanism capable of linear movement is within the scope of the present application. By way of example, the moving mechanism comprises an X-axis moving assembly 51 and a Y-axis moving assembly 52, and the X-axis moving assembly 51 comprises a third driving wheel 511, a third motor 512, an X-axis moving block 513, a third belt 514 and a third driven wheel 515; the third motor 512 is connected to a third driving wheel 511 by means of a belt, the third driving wheel 511 is connected to a third driven wheel 515 by means of a third belt 514 connected to an X-axis moving block 513, and the third motor 512 drives the third belt 514 to rotate to reach the X-axis moving block 513 to move along the X-axis.

The Y-axis moving assembly 52 comprises a beam 521 and a Y-axis sliding block 522, wherein the beam 521 is fixed to the X-axis moving block 513 and is slidably connected to the Y-axis sliding block 522, and slides on the beam 521 via the Y-axis sliding block 522; specifically, the Y-axis sliding block 522 slides on the beam under the driving of a driving member comprising a hydraulic driving member or an electric driving member; according to an embodiment of the present application, an electric driving member is used to drive the Y-axis sliding block 522 to slide on the beam 521 to drive the actuating mechanism 7 to move in the Y-axis direction; the electric driving member comprises a motor and a synchronous belt, wherein the synchronous belt is connected to the Y-axis sliding block 522, and the driving motor drives the synchronous belt to rotate to drive the Y-axis sliding block 522 to move on the beam 521.

A back point-scanning assembly 11 is provided at the bottom end of the moving mechanism 5 driving the back point-scanning assembly 11 to move to identify the sided-lines of the packaging box board 10; specifically, the back point-scanning assembly 11 is provided on the side of the Y-axis sliding block 522.

A controller 12 is electrically connected to the scanning assembly 28, the identification mechanism 8, and the back point-scanning assembly 11, wherein the controller 12 determines a creasing and cutting path of the packaging box board 10 through the scanning assembly 28, the identification mechanism 8, and the back point-scanning assembly 11.

Figure 15:
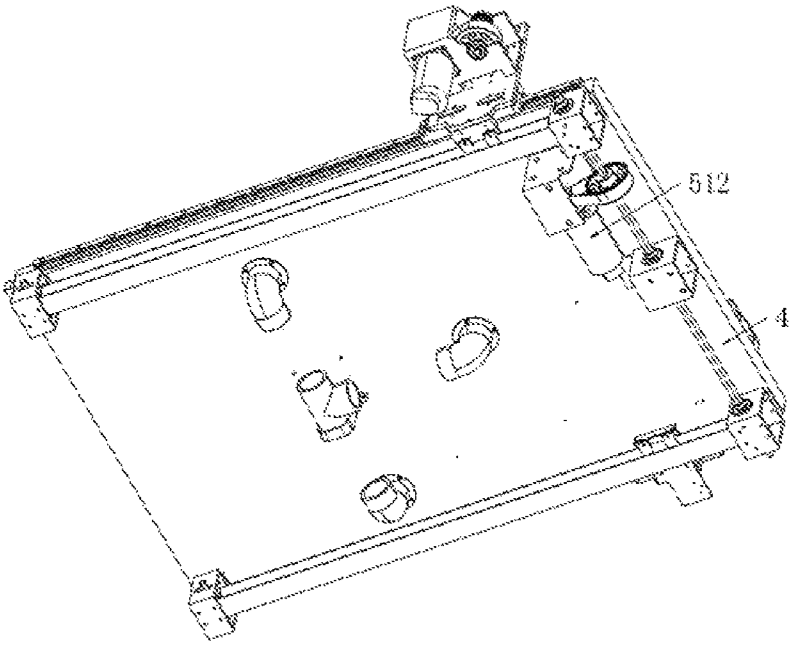
FIG. 15 is a rear structural diagram showing the primary working platform according to the present application.

A primary working platform 4 is provided inside the material-conveying mechanism 3 and is connected to an air pump via a converter; the surface of the primary working platform 4 is provided with a through-hole 41 providing two air flows for conveying the packaging box board 10; as shown in FIG. 9, when conveying the packaging box board 10, the conveying through-hole 41 can blow air on the conveyor 33 of the material-conveying mechanism 3, so that the contact surface between the conveyor 33 and the primary working platform 4 is reduced, so that the conveyor 33 drives the packaging box board 10 to move; during the creasing and cutting of the packaging box board 10, the through-hole 41 can be sucked by switching via a switcher, wherein the conveyor 33 adopts a felt structure, and the through-hole 41 suction can pass through the conveyor 33 to absorb and fix the packaging box board 10 to ensure that the packaging box board 10 does not have a displacement change during the creasing and cutting, and improve the processing accuracy, and the pipeline arrangement on the back of the primary working platform 4 is as shown in FIG. 15.

Figure 10:
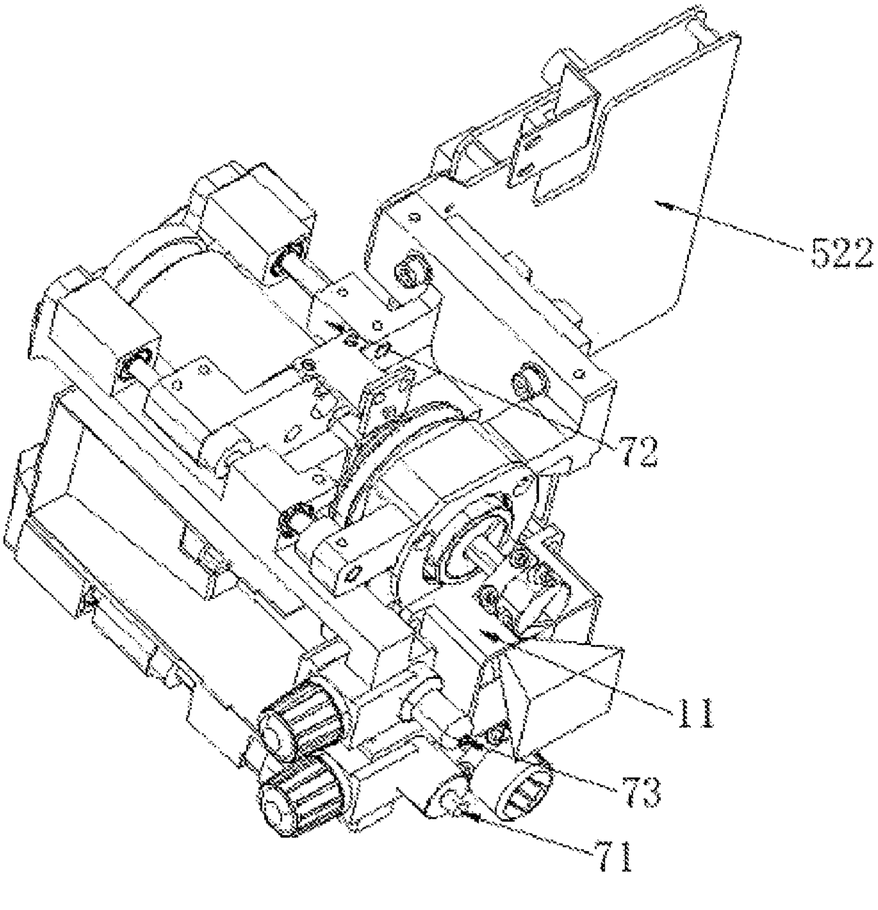
FIG. 10 is a schematic diagram showing an actuating mechanism according to an embodiment of the present application.

An actuating mechanism 7 is provided at the bottom end of the moving mechanism 5 used for driving the actuating mechanism 7 to move and crease and cut the packaging box board 10 which determines a creasing and cutting path; as shown in FIG. 10, the actuating mechanism 7 comprises a creasing head 71, an axial motor 72 and a cutting head 73, wherein the bottom end of the axial motor 72 is provided with a creasing head 71 and a cutting head 73; the axial motor 72 provides power for the lifting of the creasing head 71 and the cutting head 73; for example, the axial motor 72 is connected to the moving mechanism 5, the axial motor 72 is connected to the creasing head 71 and the cutting head 73 by means of a ball screw, and the creasing head 71 and the cutting head 73 are driven to move by means of the axial motor 72 driving the ball screw to move; the axial motor 72 can also be directly replaced with a hydraulic telescopic cylinder, and the creasing head 71 or the cutting head 73 is directly driven to lift via the hydraulic telescopic cylinder, wherein the cutting head 73 can be any device capable of cutting by a blade or a laser; a blade is used as the cutting head 73 of the present application.

In order to facilitate the collection of the creased and cut board 10 of the packaging box, a board creasing and cutting apparatus for producing a packaging box further comprises a discharging tray 6, wherein the discharging tray 6 is connected to one side of the housing 1 in an inclined manner, and one end of the discharging tray 6 is an opening 61; the width of the opening 61 is greater than the width of the discharging tray 6, and a material receiving plate 62 is connected to the side of the discharging tray 6; a base 63 is fixed to the bottom end of the discharging tray 6.

In the creasing and cutting apparatus of the present application, in use, firstly, a packaging box board 10 printed with a packaging box pattern, an identification point and a two-dimensional code is stacked on the surface of the lifting plate 25, wherein the back of the packaging box board 10 (the side without the packaging box pattern) faces upwards; using the centering assembly 23 and the baffle 24 to regularize the packaging box board 10 so that the packaging box board 10 is located at the center of the surface of the lifting plate 25; then starting the lifting assembly 21, so that the lifting assembly 21 drives the packaging box board 10 to rise, and when the top of the packaging box board 10 rises until the detection assembly 27 can detect, the lifting assembly 21 stops lifting.

Figure 3:
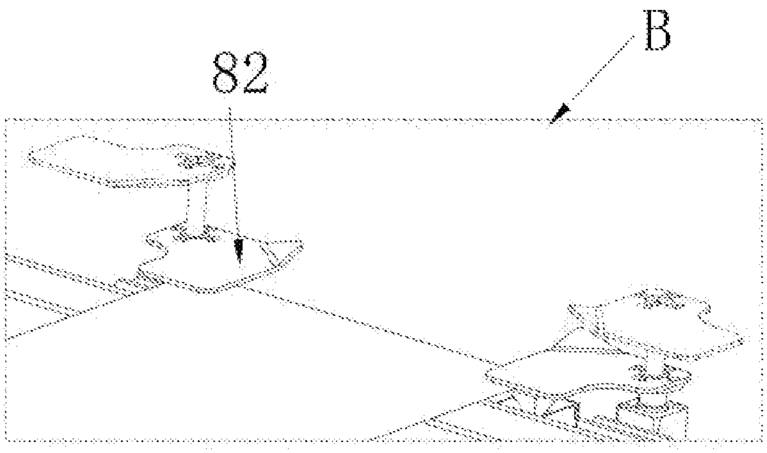
FIG. 3 is an enlarged structural diagram at B in FIG. 2 according to an embodiment of the present application.

At this moment, the feeding mechanism 9 is started to stretch the telescopic cylinder 922 to drive the vacuum chuck 924 to be in contact with the packaging box board 10, the air pump connected to the vacuum chuck 924 is started, and the packaging box board 10 is adsorbed, then the telescopic cylinder 922 is reset, and the adsorbed packaging box board 10 is driven to move to the left by the material-moving assembly 91, and when moving to the top end of the scanning platform 88, firstly, the scanning assembly 28 scans the two-dimensional code to acquire a shearing and creasing path of the packaging box board; the cutting and creasing paths of the packaging box board can be sent by the upper computer software or have been stored in the controller 12; then, the telescopic cylinder 922 moves downwards, so that one end of the packaging box board 10 is placed on the surface of the scanning platform 88, at this moment, the fourth motor 85 is started, driving the second synchronous belt 86 to move, so that the two front point-scanning assemblies 83 are respectively located at the edge of the packaging box board 10, starting to rotate the telescopic cylinder 81, so that the rotating telescopic cylinder 81 drives the pressing plate 82 to press down the sided-line at the end of the packaging box board 10, and as shown in FIGS. 2 and 3, at this moment, the front point-scanning assembly 83 is turned on for photographing to obtain the sided-line and identification point information about the first point-scanning; then the telescopic cylinder 81 is rotated to reset, the telescopic cylinder 922 is reset, and the packaging box board 10 is driven by the material-moving assembly 91 to continue to move to the left, so that the other end of the packaging box board 10 is located on the scanning platform 88, and the other end is imaged in the same manner as mentioned above.

In addition, the rear material-moving assembly 91 moves left so that the packaging box board 10 is on a top surface of the conveyor 33, an air pump connected to the vacuum chuck 924 is closed so that the packaging box board 10 is on the surface of the conveyor 33, the air pump connected to a switcher is turned on so that the through-hole 41 performs positive pressure blowing to reduce the resistance between the conveyor 33 and the primary working platform 4, and the fifth motor 31 is started so that the conveyor 33 drives the packaging box board 10 to be sent to the bottom end of the actuating mechanism 7.

Operation of the fifth motor 31 is discontinued, by switching using a switcher, the air pump is enabled to make the through-hole 41 vacuum suction to adsorb and fix the packaging box board 10 to avoid moving dislocation of the packaging box board 10, the moving mechanism 5 is turned on to enable the moving mechanism 5 to drive the back point-scanning assembly 11 to scan the four sides of the packaging box board 10 to obtain the sided-line information about the four sides obtained by the second point-scanning, and the information about the identification point in the second point-scanning state can be calculated combining the sided-line and the identification point information obtained by the first point-scanning; since the identification point has a certain position with the packaging box pattern, the information about the pattern of the packaging box in the second point-scanning state can be obtained, the pattern of the packaging box is mirrored on the back of the packaging box board 10, and the actuating mechanism 7 is started to crease and cut the packaging box board 10.

After finishing the processing, the material-conveying mechanism 3 continues to be turned on, so that the processed packaging box board 10 is conveyed into the discharging tray 6.

A board creasing and cutting method for producing a packaging box comprises the following steps of:

Step S1: determining, for each type of packaging box, a two-dimensional code corresponding thereto and an identification point capable of characterizing the position of the pattern thereof, and printing the two-dimensional code and the identification point together with the packaging box pattern on a surface of the packaging box board 10; and determining a creasing and cutting path for inputting the type of packaging box board 10;

Step S2: stacking a to-be-processed packaging box board 10 on a material-loading mechanism 2 with the back of the board facing upwards, and picking and moving a piece of the to-be-processed packaging box board 10 by means of vacuum adsorption using the material-loading mechanism 2 in combination with a feeding mechanism 9;

Step S3: scanning a two-dimensional code of the to-be-processed packaging box board 10 by a scanning assembly 28, identifying the type of the packaging box board 10, and determining the creasing and cutting path of the type of the packaging box board 10;

Step S4: moving the processing packaging box board 10 to the identification mechanism 8 via the feeding mechanism 9, and identifying and determining the four-sided boarder lines and identification point information at two ends of the front side of the packaging box board 10 from the front side using the identification mechanism 8, which specifically comprises identifying sided-lines of one end of the packaging box board 10 and identification point information using a camera and a light-supplementing lamp; moving the packaging box board 10 via the feeding mechanism 9, and identifying the sided-lines of the other end of the packaging box board 10 and the identification point location information using the camera and the light-supplementing lamp again.

Step S5: placing the identified packaging box board 10 on a material-conveying mechanism 3 using the feeding mechanism 9, and enabling the material-conveying mechanism 3 to move and convey the packaging box board 10 to a creasing and cutting position via a primary working platform 4 in cooperation with positive pressure blowing;

Step S6: identifying sided-line information about four sides of the packaging box board 10 by scanning for the second time from the back of the packaging box board 10 using a back point-scanning assembly 11;

Step S7: determining pattern information of the packaging box board 10 by using the sided-line information scanned for the second time on the back and the four-sided boarder lines and identification point information at two ends of the front side scanned on the front side;

Step S8: mirroring pattern information of the packaging box board 10 to the back of the packaging box board 10 via a controller 12, and invoking the creasing and cutting path of the type of packaging box board 10; and Step S9: fixing the packaging box board 10 via the primary working platform 4 in cooperation with the negative pressure suction and performing a creasing-cutting action on the back of the packaging box board using an actuating mechanism 7 according to the creasing and cutting path, and outputting the processed semi-finished product.

The centering assembly provided in the material-loading mechanism of the present application is capable of centering and placing a plurality of stacked packaging box boards without subsequent adjustment by an operator, and the design of the board separating and stirring piece and the tuyere can eliminate the adhesion between the boards and ensure that only one packaging box board is absorbed and picked at a time for processing; and it is convenient for use.

According to the present application, an identification point is provided on a surface of the packaging box board, and a pattern of the packaging box board can be mirrored on the back of the packaging box board by recognition twice to facilitate the subsequent direct creasing and cutting, without using a turnover device, so that the structure of the whole creasing and cutting apparatus is simpler and the processing efficiency is higher.

The present application is fully automated without human intervention and with low labor costs.

The material-loading mechanism 2, the material-conveying mechanism 3, the discharging tray 6, the actuating mechanism 7, the identification mechanism 8 and the feeding mechanism 9 of the present application can work independently without affecting each other, and can also be provided in the same housing to form a single device, and the device composed of the above-mentioned mechanisms are all within the scope of protection of the present application.

The technical scope of the present application is not limited to the above description, and a person skilled in the art may make various changes and modifications to the above-described embodiments without departing from the technical spirit of the present application, and all such changes and modifications should fall within the scope of the present application.

What is claimed is:

1. A board creasing and cutting apparatus for producing a packaging box, comprising:

a packaging box board having a surface provided with a two-dimensional code corresponding thereto and an identification point characterizing a location of a pattern thereof;

a housing having one end provided with a material-loading mechanism used for conveying a to-be-processed packaging box board to a predetermined height;

a feeding mechanism provided at a top end of the housing and used for adsorbing and moving the packaging box board reaching the predetermined height;

a scanning assembly provided on a surface of the housing and used for scanning the two-dimensional code on the surface of the packaging box board to acquire packaging box board pattern information;

an identification mechanism provided on a surface of the housing and used for identifying sided-lines and an identification point location of the conveyed packaging box board;

a material-conveying mechanism used for conveying the identified packaging box board;

a moving mechanism slidably connected to the top end of the housing;

a back point-scanning assembly provided at a bottom end of the moving mechanism driving the back point-scanning assembly identifies the sided-lines of the packaging box board;

a controller electrically connected to the scanning assembly, the identification mechanism, and the back point-scanning assembly, wherein the controller determines a creasing and cutting path of the packaging box board through the scanning assembly, the identification mechanism, and the back point-scanning assembly;

a primary working platform provided inside the material-conveying mechanism and connected to an air pump via a converter, wherein a surface of the primary working platform is provided with a through-hole providing two air flows for conveying the packaging box board; and an actuating mechanism provided at the bottom end of the moving mechanism, wherein the moving mechanism is used for driving the actuating mechanism to move to crease and cut the packaging box board defining the creasing and cutting path.

2. The board creasing and cutting apparatus for producing a packaging box according to claim 1, wherein the material-loading mechanism comprises a lifting assembly, a bearing plate, a lifting plate, a tuyere and a detection assembly; the lifting assembly is mounted inside the housing, and a top end of the lifting assembly is provided with a lifting plate; the lifting assembly is used for driving the lifting plate to lift, and a side of the housing is provided with a bearing plate; the top end of the bearing plate is provided with a board separating and stirring piece; a tuyere connected to the air pump and a detection assembly for detecting the lifting height of the packaging box board are provided on a side of the bearing plate.

3. The board creasing and cutting apparatus for producing a packaging box according to claim 2, wherein the material-loading mechanism further comprises a centering assembly and a baffle; a surface of the lifting plate is provided with a baffle, the lifting plate is of a metal structure, and the bottom end of the baffle is provided with a magnet; the centering assembly comprises a blocking assembly, pulleys and a first synchronous belt, and a surface of the lifting plate is provided with a first sliding groove; the pulleys are rotatably connected to the bottom end of the lifting plate, and the pulleys are connected to each other via a first synchronous belt; two blocking assemblies are respectively connected to two sides of the first synchronous belt, and the first synchronous belt is capable of rotating to drive the two blocking assemblies to move close to or away from each other; the blocking assembly comprises a vertical plate, a connecting plate and a first mounting plate, and two sides of a bottom end of the vertical plate are inserted into and slide along the first sliding groove; the two sides of the bottom end of the vertical plate are connected via a connecting plate, and the bottom end of the connecting plate is connected to the first synchronous belt via a first mounting plate.

4. The board creasing and cutting apparatus for producing a packaging box according to claim 1, wherein the feeding mechanism comprises a material-moving assembly and a material fetching assembly, and the material-moving assembly is used for driving the material fetching assembly to move linearly; the material fetching assembly comprises an overhang plate, a telescopic cylinder, a transverse plate and vacuum chucks; the overhang plate is connected to the material-moving assembly, and the overhang plate is connected to the telescopic cylinder; the telescopic cylinder is connected to the transverse plate, and a plurality of vacuum chucks are fixed on a surface of the transverse plate; the vacuum chucks are connected to the air pump.

5. The board creasing and cutting apparatus for producing a packaging box according to claim 1, wherein the identification mechanism comprises rotating telescopic cylinders, a pressing plate, front point-scanning assemblies, a connecting block, a fourth motor, a second synchronous belt, second mounting plates, a scanning platform and a fourth driven wheel, a scanning platform is fixed inside the housing, and the scanning platform is of a transparent structure; a connecting block is provided at a side of the scanning platform, and a second sliding groove is provided on a surface of the connecting block; two front point-scanning assemblies are slidably connected inside the scanning platform, and a side of each of the front point-scanning assemblies is connected to a rotating telescopic cylinder; a pressing plate is fixed at a top end of each of the rotating telescopic cylinders, a second mounting plate is fixed at bottom ends of the two rotating telescopic cylinders, and the two second mounting plates are both mounted on a side of the second synchronous belt; the second synchronous belt is respectively connected to a fourth driven wheel and a fourth driving wheel, and the fourth driving wheel is connected to a fourth motor.

6. The board creasing and cutting apparatus for producing a packaging box according to claim 5, wherein one of the corners of the pressing plate is tilted, and a light-shading plate is provided on a surface of the pressing plate; the front point-scanning assembly and the back point-scanning assembly are of the same structure, and the front point-scanning assembly comprises a camera and a light-supplementing lamp.

7. The board creasing and cutting apparatus for producing a packaging box according to claim 1, wherein the actuating mechanism comprises a creasing head, an axial motor and a cutting head, a bottom end of the axial motor is provided with the creasing head and the cutting head.

8. The board creasing and cutting apparatus for producing a packaging box according to claim 1, wherein the actuating mechanism further comprises a discharging tray obliquely connected to one side of the housing, and one end of the discharging tray is an opening; the width of the opening is greater than that of the discharging tray, and a material receiving plate is connected to a side of the discharging tray; a base is fixed at the bottom end of the discharging tray.

* * * * *